United States Patent [19]

Kiendl

[11] Patent Number: 4,558,817

[45] Date of Patent: Dec. 17, 1985

[54] ELECTRONICALLY CONTROLLED MIXING VALVE

[75] Inventor: Harro Kiendl, Witten-Bommern, Fed. Rep. of Germany

[73] Assignee: Friedrich Grohe Armaturenfabrik GmbH & Co., Hemer, Fed. Rep. of Germany

[21] Appl. No.: 287,621

[22] Filed: Jul. 28, 1981

[30] Foreign Application Priority Data

Aug. 14, 1980 [DE] Fed. Rep. of Germany ....... 3030765

[51] Int. Cl.[4] .............................................. G05D 23/13
[52] U.S. Cl. .............................. 236/12.12; 137/505.14; 236/12.15
[58] Field of Search ............... 236/12.15 M, 12.11 A, 236/12.12 AB; 137/88, 505.14

[56] References Cited

U.S. PATENT DOCUMENTS

| | | | |
|---|---|---|---|
| 2,072,384 | 3/1937 | Schmidt | 137/88 X |
| 3,250,218 | 5/1966 | Sinclair | 137/88 X |
| 3,322,342 | 5/1967 | Veale | 236/12.12 |
| 3,405,551 | 10/1968 | Halasz | 137/505.41 X |
| 3,526,360 | 9/1970 | Ray | 137/505.41 X |
| 3,603,214 | 9/1971 | Murrell | 137/505.41 X |
| 3,682,437 | 8/1972 | Miller | 137/505.41 X |

Primary Examiner—William E. Tapolcai
Attorney, Agent, or Firm—Karl F. Ross; Herbert Dubno

[57] ABSTRACT

In a pressure compensated mixing valve, the hot and cold water lines each include electrically actuated valves. Each valve has a movable valve rod coupled to a valve cone via a deformable member. The deformable members are acted upon such that as water pressure increases or decreases, the deformable member moves the valve cone to a more closed or opened position.

7 Claims, 4 Drawing Figures

ELECTRONICALLY CONTROLLED MIXING VALVE

BACKGROUND OF THE INVENTION

This invention pertains, in general, to mixing valve arrangements and, in particular, to a mixing valve arrangement for mixing water in sanitary applications and having an electrically actuated supply valve in the hot and cold water supply lines and a preselection device.

Mixing valves of this type are well known through, for example, CH-PS No. 451 626 and DE-OS No. 23 23 841. One characteristic of such mixing valves is that sudden fluctuations of pressure in the supply mains always have an initial effect on the mixed water temperature. In particular, the mixing water temperature increases considerably at first when the pressure in the cold water supply main falls suddenly. Such a sudden fall in cold water pressure can occur, for example, when a parallel connected consumer suddenly draws off large volumes of cold water (flushing a WC etc.). When a high mixed water temperature has already been set, a sudden fall in cold water pressure can present a danger of scalding. This problem of the well known type of mixing valve is due to a certain delay in control changes in response to the altered value of the mixing water temperature. This time delay depends on the length of time it takes for the water to flow from the mixing chamber to the temperature detector, the time constant of the temperature detector - which is also increased still further by the thermal capacity of the surrounding mixing chamber - and by the time constant of the control elements. It is of course possible in principle to reduce the time constants, but this very considerably increses the cost of the temperature detector and the control elements. For this reason, the well know types of mixing valve have the main disadvantage that pressure fluctuations in the supply mains always manifest themselves as more or less large initial variations of the mixed water temperature irrespective of how the control principle is applied in detail.

It is one object of the invention to provide an improved mixing valve of the aforementioned type by considerably improving the constancy of the mixing water temperature when the pressure fluctuates in the supply mains.

SUMMARY OF THE INVENTION

In accordance with the principles of the invention the control forces created by the electrical control elements are not directly transmitted to the closure cone of the supply valve by a rigid connection, but are transmitted via pressure sensitive coupling elements which respond to the static pressure prevailing at any particular time in the supply valve outlet. If the pressure rises, the active pressure sensitive element of the coupling link connected between supply valve and control element is deformed so as to shift the closure cone of the respective supply valve to reduce the volume of flow and at the same time the inlet pressure. The mode of operation of the pressure sensitive coupling links therefore forms the basis of control of the supply pressures. The time delay at which such a basic pressure control circuit responds can therefore be kept very small since the force required to adjust the closure cone is applied directly by the pressure fluctuations. Accordingly, the initial fluctuations of mixed water temperature which are induced by sudden changes of the supply pressures are substantially reduced. Furthermore, the effectiveness control of the mixed water temperature is improved.

Fluctuations in the volume of mixed water flowing which are unavoidable when there are fluctuations in the supply pressure and which are particularly great when using a conventional pressure equalization control on the supply side are considerably reduced with the arrangement in accordance with the invention.

In addition, the influence of pressure fluctuations in the supply mains on the mixed water temperature is not only markedly reduced in the short term but also in the long term so that the electrical control loop on the delivery side provides a total greater effectiveness of control or, on the other hand, may be less expensively designed if such a high degree of control effectiveness is unnecessary. Where the need for a controlled mixing valve is primarily based on expected fluctuations of the supply pressure and less on variations of supply temperature, it is possible to do without sensing the mixed water temperature with a thermocouple, as in prior mixing valves, so that a less expensive open loop control can be used instead of a closed control loop.

Additionally, the use of pressure sensitive coupling links provides a further advantage as the selected delivery volume is less dependent on fluctuations of supply pressures, especially where a manually operated valve is used for the mixed water delivery.

BRIEF DESCRIPTION OF THE DRAWINGS

The invention may be better understood from a reading of the following detailed description in conjunction with the drawings in which like reference designations are used for like or equivalent elements and in which.

DETAILED DESCRIPTION

Figure 1:
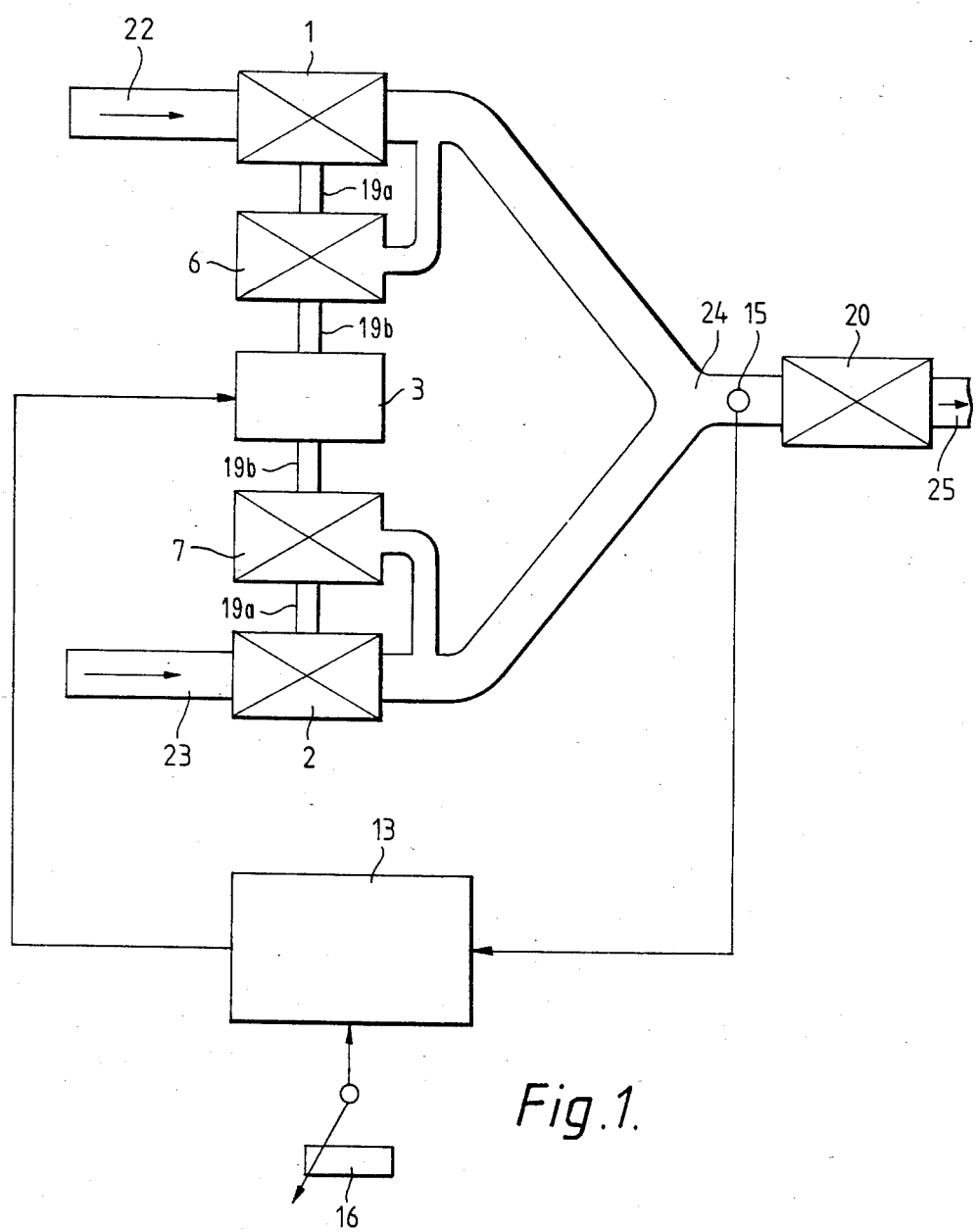
FIG. 1 is a schematic diagram of a mixing valve arrangement in accordance with the invention.

The mixing valve arrangement shown in FIG. 1 consists of a supply valve 1 in the cold water supply main 22 a supply valve 2 in the warm water supply main 23, a mixing chamber 24 on the delivery side, and a mixed water delivery pipe 25. The supply valves 1 and 2 are infinitely variable in opposite directions by an electrical control element 3 and each has an elastically deformable element 6, 7 on the supply side. In addition, a manually operated volume control valve 20 is provided for example behind the mixing chamber 24 to control the delivered volume of mixed water. The electronic control of the mixed water temperature is represented by block 13, the desired value being fed into block 13 from a temperature preselector 16. The temperature of the mixed water produced in the mixing chamber 24 is measured downstream by an electronic temperature detector 15 and fed into block 13 as the actual value. An output signal is generated by block 13 in response to detection 15 and is fed to the electrical control element 3, so that when the volume control valve 20 is opened, mixed water flows in the mixed water delivery pipe 25 at the temperature set by the temperature preselector 16.

Figure 2:
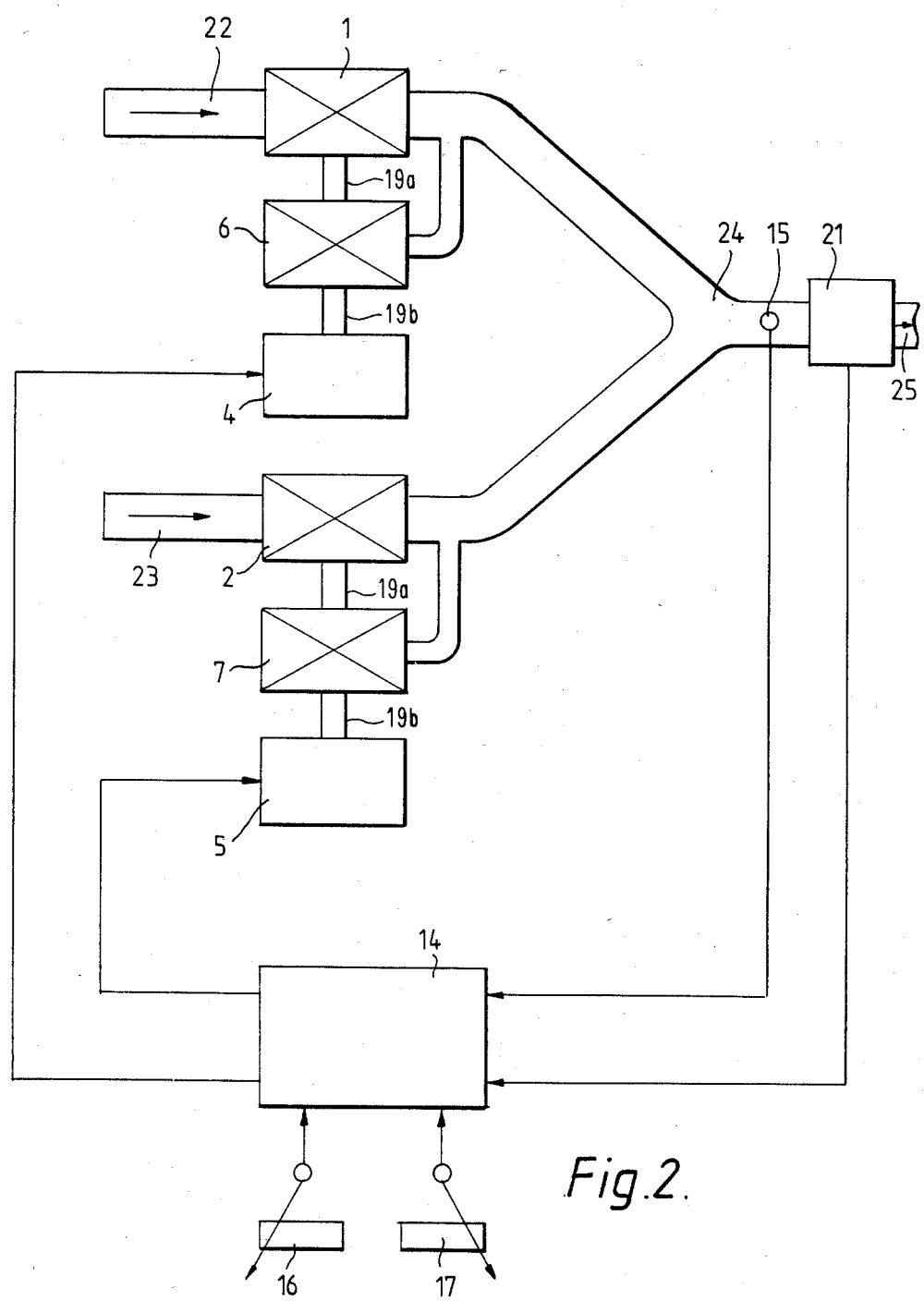
FIG. 2 is a schematic diagram of a second mixing valve arrangement in accordance with the invention.

In a mixing valve shown in FIG. 2, a separate electrical control element 4, 5 is provided for each supply valve 1, 2. The supply valves 1 and 2 are thereby infinitely variable independent of each other. Block 14 essentially consists of a control loop for the temperature, a control loop for the volume of mixed water delivered and a decoupling element. Both desired values can be fed separately to block 14 by means of a temperature preselector 16 and a volume preselector 17. The actual values of the mixed water produced in the mixing chamber 24 are measured by an electronic temperature detector 15 and a measuring element 21 for the volume of mixed water, both being located behind the mixing chamber 24, the measured values likewise being fed to block 14. Based on these input values, two output control signals are generated by block 14, one of which controls the electrical control element 4 and the other of which controls the electrical control element 5 as input values.

The same supply valves 1, 2 with their associated elastically deformable elements 6, 7 or pressure sensitive coupling elements can be used in the abovementioned examples shown in FIGS. 1 and 2.

Figure 3:
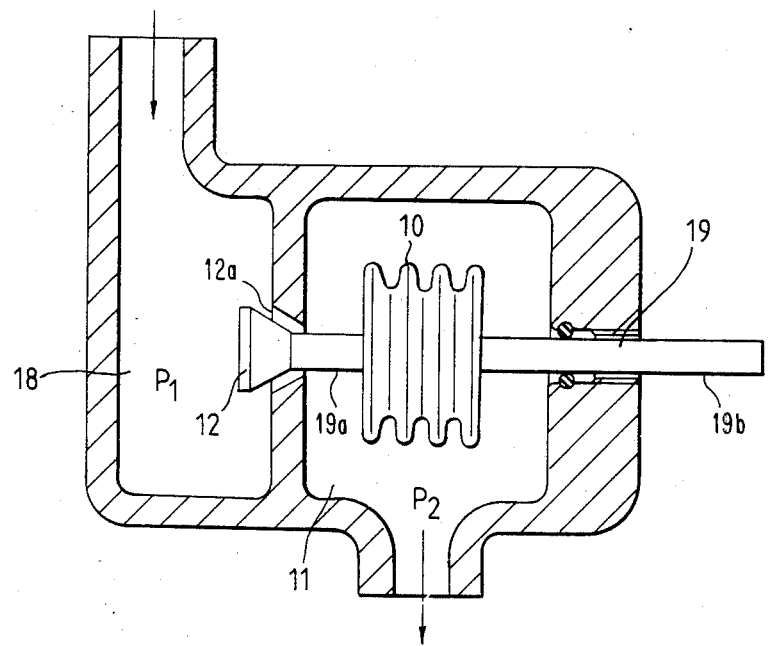
FIG. 3 illustrates in longitudinally cross-section, a supply valve.

One arrangement for a supply valve 1 or 2 is shown in FIG. 3. The supply water first flows into a chamber 18 on the inlet side and from there it flows into a chamber 11 through an aperture 12a, valve cone 12 controls the flow volume through the aperture 12a. The cone 12 is rigidly connected with one section 19a of a valve spindle to a pressure bellows 10 which is coupled to another section 19b of the valve spindle. This other section 19b of the spindle extends from the valve housing and is coupled to an electrical control element such as element 3, 4 or 5. The position of the closure cone 12 can thus be affected by the action of the control element on spindle 19. Additionally, the position can also be affected by the pressures $P_1$ and $P_2$ in the chambers 18 and 11. With the pressure bellows 10 designed so that its cross-sectional area is large in proportion to the cross-sectional area of the closure cone 12, the effect of pressure $P_1$ on the positioning of the closure cone 12 can be neglected provided that the ratio of pressure $P_2$ to $P_1$ does not assume very small values. This arrangement has the following characteristics: the closure cone 12 closes at a predetermined level of pressure $P_2$ (dependent on the position in which the valve spindle has been placed by the control element). The closure cone 12 opens again if the pressure level of pressure $P_2$ falls below this predetermined level. For each position of the valve spindle therefore, there is quite specific pressure $P_2$ which remains constant, irrespective of the value of pressure P, due to the mode of operation of the pressure bellows 10 (within the limits of accuracy possible with a proportional controller).

It is, therefore, evident that when the valve of FIG. 3 is utilized in the arrangement of FIG. 1 or FIG. 2, that valve cone 12 and aperture 12a correspond to either supply valve 1 or 2 of FIG. 1 and the bellows 10 corresponds to the elastically deformable element 6 or 7.

Figure 4:
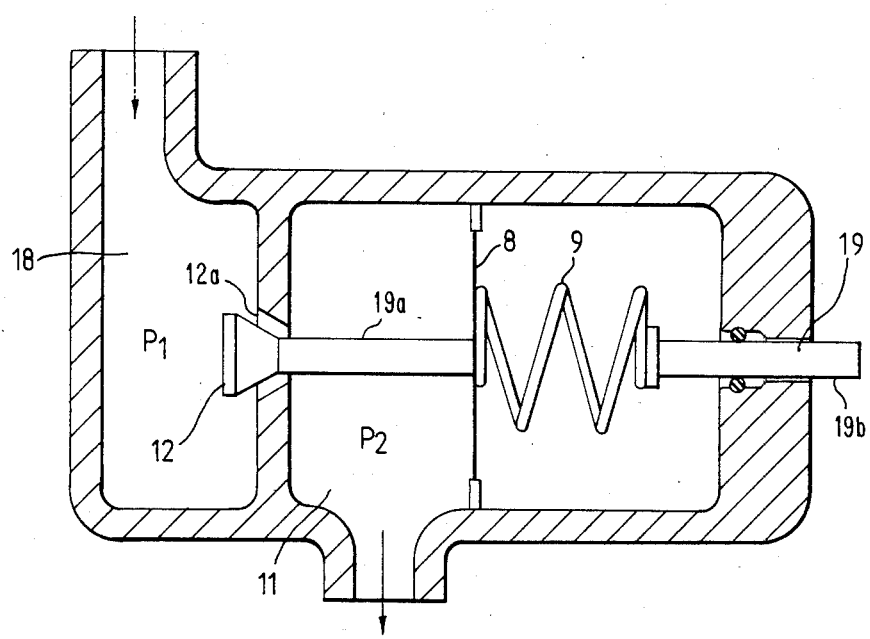
FIG. 4 illustrates another supply valve in longitudinal cross-secton.

In the design of valve shown in FIG. 4, the function of the pressure bellows 10 is assumed by a flexible diaphragm 8 to which a spring 9 is connected. The diaphragm 8 in this way divides the chamber 11 on the outlet side.

Valve spindle section 19a is coupled directly to one side of diaphragm 8. Valve section 19b is coupled on one end to diaphragm 8 via spring 9. Valve section 19b is coupled on its other end to an electrical control element 3, 4 or 5. This arrangement provides a flexible coupling between the sections 19a, 19b. The spring 9 and diaphragm 8 function in essentially the same manner as bellows 10 of FIG. 3. Spindle section 19a and hence valve cone 12 is positioned by spindle section 19b acting on spring 9 and diaphragm 8. The level of fluid pressure $P_2$ acting on diaphragm 8 will displace diaphragm 8 to open or close the valve cone 12 depending on variations of fluid pressure.

As with the valve of FIG. 3, valve cone 12 and aperture 12a correspond to the supply valve 1 or 2 of FIG. 1 or 3 and the diaphragm 8 and spring 9 correspond to the elastically deformable element 6 or 7.

The valve of FIG. 3 or that of FIG. 4 may be used for either or both of the valves shown schematically in FIG. 1 or in FIG. 2.

What is claimed is:

1. A mixing valve arrangement for mixing hot water from a first supply line and cold water from a second supply line to obtain a mixture of said hot and cold water at an outlet, said arrangement comprising:
   first means for preselecting the temperature of said mixture;
   a first supply valve coupled between said first supply line and said outlet;
   a second supply valve coupled between said second supply line and said outlet;
   second means for sensing the temperature of said mixture at said outlet;
   third means responsive to said first and second means for generating mechanical forces for actuating said first and second supply valves;
   each of said first and second supply valves comprising a valve body having an inlet chamber coupled to a respective one of said first or second supply lines and an outlet chamber coupled to said outlet, a valve opening between said first and second chambers, a movable valve cone for controlling fluid flow through said opening, a movable valve spindle extending from said valve body and displaceable in response to said mechanical forces, and an elastically deformable element coupled between said valve cone and said valve spindle for transmitting movements of said spindle to said valve cone, said deformable element being responsive to fluid pressure in said valve such that an increase in said fluid pressure causes deformation of said deformable element in a first direction to carry said valve cone in a direction to decrease fluid flow through said valve opening and a decrease in said fluid pressure causes deformation of said deformable element in a second direction to carry said valve cone in a direction to increase fluid flow through said valve opening, whereby fluid pressure downstream of said outlet chamber is maintained constant regardless of pressure variations in said inlet chamber.

2. A mixing valve arrangement in accordance with claim 1, wherein said elastically deformable element of at least one of said first or second supply valves comprises a pressure bellows disposed in said outlet chamber, one end of said bellows being connected to said valve spindle and the other end being connected to said valve cone via a spindle section.

3. A mixing valve arrangement in accordance with claim 1, wherein said elastically deformable element of at least one of said first or second supply valves comprises a diaphragm dividing said outlet chamber and a spring connected between one side of said diaphragm and said spindle, and a spindle section is coupled between the other side of said diaphragm and said valve cone.

4. A mixing valve arrangement in accordance with claims 1, 2 or 3 wherein said third means actuates said valve cones of said first and second supply valves in opposite directons.

5. A mixing valve arrangement in accordance with claims 1, 2 or 3 wherein said third means comprise a first electrical control element for actuating said first supply valve and a second electrical control element for actuating said second supply valve independently of said first supply valve.

6. A mixing valve arrangement in accordance with claim 4 comprising fifth means for measuring fluid volume at said outlet and coupled to said third means; and sixth means coupled to said third means for preselecting said fluid volume.

7. A mixing valve arrangement in accordance with claim 5 comprising fifth means for measuring fluid volume at said outlet and coupled to said third means; and sixth means coupled to said third means for preselecting said fluid volume.

* * * * *